(12) United States Patent
Karasawa (10) Patent No.: US 6,914,727 B2
(45) Date of Patent: Jul. 5, 2005

(54) IMAGING OPTICAL SYSTEM (75) Inventor: Hiroyuki Karasawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 302 days.

(21) Appl. No.: 10/376,251

(22) Filed: Mar. 3, 2003

(65) Prior Publication Data

US 2003/0164446 A1 Sep. 4, 2003

(30) Foreign Application Priority Data

Mar. 4, 2002 (JP) .......................................... 2002-056880

(51) Int. Cl.$^7$ ................................................. G02B 9/00
(52) U.S. Cl. ........................ 359/653; 359/206; 359/662
(58) Field of Search ................................ 359/652–654, 359/206, 662

(56) References Cited

U.S. PATENT DOCUMENTS

| | | | |
|---|---|---|---|
| 4,025,157 A | 5/1977 | Martin | |
| 4,844,589 A | 7/1989 | Asahara et al. | |
| 6,115,187 A | 9/2000 | Tabata et al. | |
| 6,429,977 B2 | 8/2002 | Kittaka | |
| 6,449,414 B1 * | 9/2002 | Tahara et al. | 385/120 |
| 6,519,091 B2 * | 2/2003 | Toyama | 359/654 |
| 6,683,722 B2 * | 1/2004 | Ogi | 359/619 |
| 6,816,319 B2 * | 11/2004 | Tsuda et al. | 359/652 |

FOREIGN PATENT DOCUMENTS

| | | |
|---|---|---|
| EP | 1 205 770 A2 | 5/2002 |
| JP | 1-101540 | 4/1989 |
| JP | 6-208081 A | 7/1994 |

* cited by examiner

Primary Examiner—Scott J. Sugarman
(74) Attorney, Agent, or Firm—Sughrue Mion, PLLC (57) ABSTRACT

An imaging optical system which images a line image extending in a main scanning direction in a two-dimensional image as an erected image at a unit magnification in the main scanning direction includes an erecting unit optical system consisting of a plurality of refractive index profile type optical elements, each having a refractive index profile where the refractive index is reduced toward opposite ends in the main scanning direction from the center thereof, arranged in the main scanning direction, and a condenser optical system which is disposed along the main scanning direction on the light incident side or on the light incident side and the imaging side of the erecting unit optical system and has a power only in a sub-scanning direction. The numerical aperture in the main scanning direction the optical elements is smaller than the numerical aperture in the sub-scanning direction of the condenser optical system.

8 Claims, 10 Drawing Sheets

IMAGING OPTICAL SYSTEM

BACKGROUND OF THE INVENTION

1. Field of the Invention

This invention relates to an imaging optical system which images a line image extending in a main scanning direction in a two-dimensional image as an erected image at a unit magnification in the main scanning direction.

2. Description of the Related Art

When certain kinds of phosphor are exposed to a radiation, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been put into practice as CR (Computed Radiography) a radiation image recording/reproducing system in which a stimulable phosphor sheet (a sheet provided with a layer of the stimulable phosphor) is exposed to a radiation passing through an object such as a human body to have a radiation image of the object stored on the stimulable phosphor sheet, a stimulating light beam such as a laser beam is caused to scan the stimulable phosphor sheet by causing the stimulating light beam to scan the stimulable phosphor sheet in a main scanning direction while conveying the stimulable phosphor sheet in a sub-scanning direction perpendicular to the main scanning direction, the stimulated emission emitted from the stimulable phosphor sheet pixel by pixel is photoelectrically detected, thereby obtaining an image signal (a radiation image signal), and then a radiation image of the object is reproduced as a visible image on the basis of the radiation image signal on a recording medium such as a photographic film or a display such as a fine CRT.

In the radiation image read-out apparatus employed in the radiation image recording/reproducing system, in order to shorten the reading time and reduce the overall size of the apparatus and the cost, it has been proposed to use a line light source, an erecting unit imaging lens and a line sensor to photoelectrically read out the stimulated emission and obtain an image signal. For example, a linear stimulating light beam extending in a main scanning direction is projected onto the stimulable phosphor sheet running in a sub-scanning direction, and the stimulated emission emitted from the linear part of the stimulable phosphor sheet exposed to the linear stimulating light beam is imaged on a line sensor comprising a plurality of photoelectric convertor elements arranged in the main scanning direction by an erecting unit imaging lens as an erected image at a unit magnification. See, for instance, Japanese Unexamined Patent Publication No. 1(1989)-101540.

As the erecting unit imaging lens, there has been employed a refractive index profile type lens array comprising a plurality of tubular lenses (Selfoc Lens™), each having a refractive index profile in a radial direction, arranged in the main scanning direction. (U.S. Pat. No. 6,429,977)

However, such a refractive index profile type lens array comprising a plurality of cylindrical lenses cannot be sufficiently large in refractive index profile (the difference between the maximum refractive index and the minimum refractive index) in the radial direction and is difficult to increase the aperture, which results in a limited NA (numerical aperture) and unsatisfactory light collecting efficiency.

Even if the refractive index profile can be increased, there arises a problem that the resolution in the main scanning direction in which the image is formed in an erected state at a unit magnification deteriorates when the NA is enlarged to preferentially increase the light collecting efficiency since the refractive index profile increases at the same rate in both the main scanning direction and the sub-scanning direction.

SUMMARY OF THE INVENTION

In view of the foregoing observations and description, the primary object of the present invention is to provide an imaging optical system which can increase the light collecting efficiency without deteriorating the resolution in the main scanning direction.

In accordance with a first aspect of the present invention, there is provided an imaging optical system which images a line image extending in a main scanning direction in a two-dimensional image as an erected image at a unit magnification in the main scanning direction, wherein the imaging optical system comprises an erecting unit optical system consisting of a plurality of refractive index profile type optical elements, each having a refractive index profile where the refractive index is reduced toward opposite ends in the main scanning direction from the center thereof, arranged in the main scanning direction, and a condenser optical system which is disposed along the main scanning direction on the light incident side or on the light incident side and the imaging side of the erecting unit optical system and has a power only in a sub-scanning direction, and the numerical aperture in the main scanning direction of each of said refractive index profile type optical elements is smaller than the numerical aperture in the sub-scanning direction of the condenser optical system.

Said "a two-dimensional image" may be any image so long as it is two-dimensionally formed. For example, said "a two-dimensional image" includes a radiation image recorded on the aforesaid stimulable phosphor sheet, an image formed by a plurality of two-dimensionally arranged spots (e.g., fluorescent marks) and the like.

In accordance with a second aspect of the present invention, there is provided an imaging optical system which images a line image extending in a main scanning direction in a two-dimensional image as an erected image at a unit magnification in the main scanning direction, wherein the imaging optical system comprises an erecting unit optical system consisting of a plurality of refractive index profile type optical elements, each having a refractive index profile where the refractive index is reduced toward opposite ends in the main scanning direction from the center thereof, arranged in the main scanning direction, and a condenser optical system which is disposed along the main scanning direction on the light incident side or on the light incident side and the imaging side of the erecting unit optical system and has a power only in a sub-scanning direction, and a light-shielding structure is provided between said refractive index profile type optical elements.

The expression "a light-shielding structure is provided" means, for instance, loading a light-shielding member between said refractive index profile type optical elements, or applying light-shielding paint to the element itself. Such light-shielding paint may be applied to the element after roughening the surface.

In the imaging optical systems in accordance with the first and second aspects of the present invention, it is preferred that the difference between the maximum refractive index and the minimum refractive index be not smaller than 0.02 and not larger than 0.2.

Further, each refractive index profile type optical element may be formed of a pair of axial lenses each of which has a refractive index profile where the refractive index is reduced from one end to the other and which are bonded together at their higher refractive index side ends.

In this case, the pair of axial lenses are formed by cutting in two an axial lens along a plane extending in the direction of the refractive index profile. When the axial lenses are bonded by adhesive, it is preferred that the adhesive joint be not larger than 200 μm in thickness and the refractive index n of the adhesive joint satisfies formula $$-0.02 \leq n-n_g \leq 0.1$$

wherein, $n_g$ represents the refractive index of the pair of axial lenses at the portion in contact with the adhesive joint.

In the imaging optical system in accordance with the first aspect of the present invention, the apertures of the lenses can be larger and the refractive index gradient can be sharper as compared with the conventional imaging optical system comprising a cylindrical refractive index profile type lenses. As a result, the numerical aperture can be enlarged and the light collecting efficiency can be improved. Further, since the numerical aperture in the main scanning direction of each of said refractive index profile type optical elements is smaller than the numerical aperture in the sub-scanning direction of the condenser optical system, the light collecting efficiency can be improved without deteriorating the resolution in the main scanning direction.

In the imaging optical system in accordance with the second aspect of the present invention,. the numerical aperture can be enlarged and the light collecting efficiency can be improved as in the imaging optical system in accordance with the first aspect of the present invention. Further, since a light-shielding structure is provided between said refractive index profile type optical elements, the light collecting efficiency can be improved without deteriorating the resolution in the main scanning direction.

When the difference between the maximum refractive index and the minimum refractive index is not smaller than 0.02 and not larger than 0.2 in the imaging optical systems in accordance with the first and second aspects of the present invention, the light collecting efficiency and the resolution can be well balanced with each other in the main scanning direction.

Further, when each refractive index profile type optical element is formed of a pair of axial lenses each of which has a refractive index profile where the refractive index is reduced from one end to the other and which are bonded together at their higher refractive index side ends, the imaging optical systems in accordance with the first and second aspects of the present invention can be easily produced.

When the pair of axial lenses are formed by cutting in two an axial lens along a plane extending in the direction of the refractive index profile, mismatch of the refractive index at the joint between the pair of axial lenses can be avoided.

When the axial lenses are bonded by adhesive, the adhesive joint is not larger than 200 μm in thickness and the refractive index n of the adhesive joint satisfies formula $-0.02 \leq n-n_g \leq 0.1$ wherein, $n_g$ represents the refractive index of the pair of axial lenses at the portion in contact with the adhesive joint, turbulence of imaging properties due to total internal reflection can be prevented even at the adhesive joint, and at the same time, generation of artifact due to an optical path shift at the adhesive joint can be prevented.

DESCRIPTION OF THE PREFERRED EMBODIMENT

Figure 1:
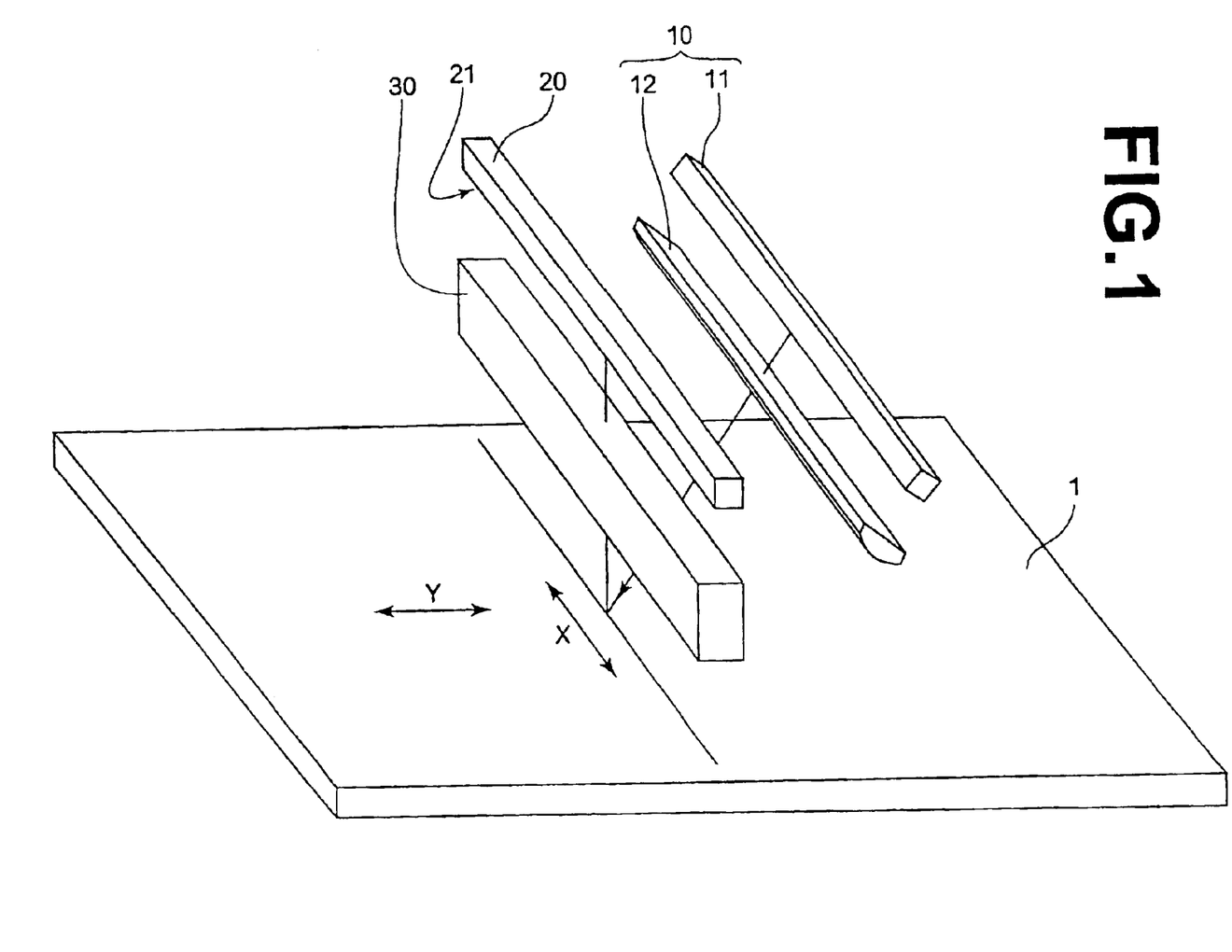
FIG. 1 is a schematic view for illustrating a radiation image read-out apparatus using an imaging optical system in accordance with an embodiment of the present invention.
Figure 2:
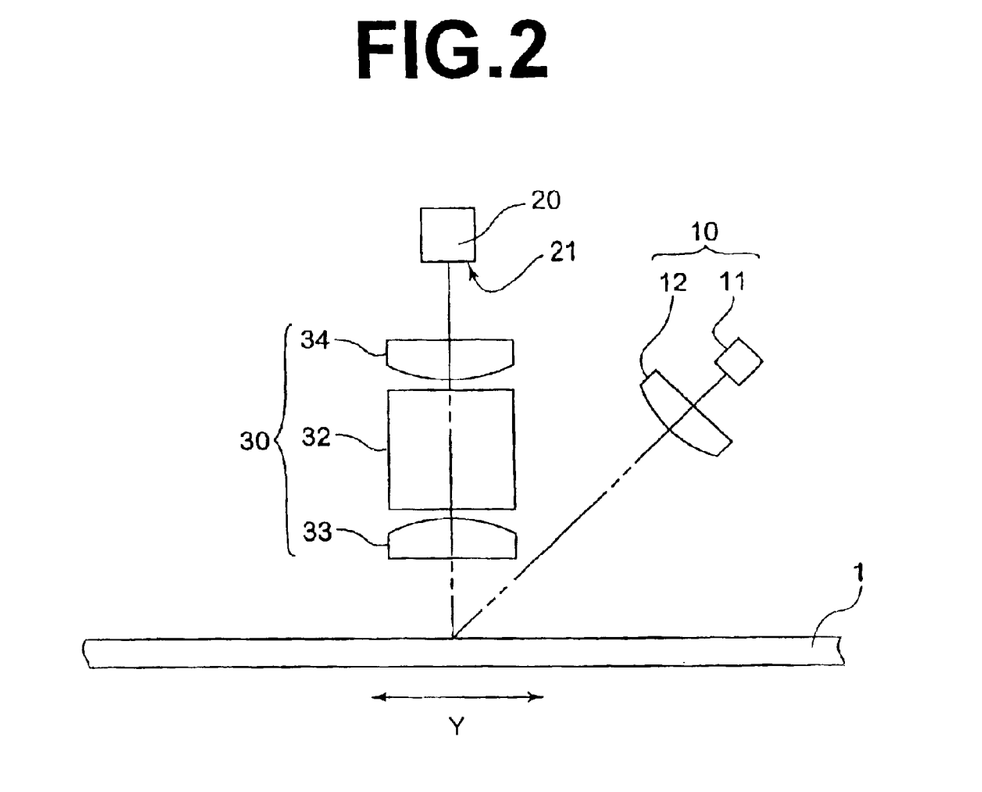
FIG. 2 is a side view of the radiation image read-out apparatus shown in FIG. 1, FIGS. 3A and 3B are side and front views showing the imaging optical system employed in the radiation image read-out apparatus.

In FIGS. 1 and 2, a radiation image read-out apparatus using an imaging optical system in accordance with an embodiment of the present invention comprises a stimulating light projecting means 10 which projects, onto a stimulable phosphor sheet 1, a line-like stimulating light beam extending in the direction of arrow X (main scanning direction) while conveying the stimulable phosphor sheet 1 in the direction of arrow Y (sub-scanning direction) perpendicular to the main scanning direction, a line sensor 20 comprising a plurality of photoelectric convertor elements arranged in the main scanning direction to receive linear stimulated emission emitted from the stimulable phosphor sheet 1 upon exposure to the stimulating light beam, and an imaging optical system 30 which is disposed between the stimulable phosphor sheet 1 and the line sensor 20 to image the linear stimulated emission emitted from the stimulable phosphor sheet 1 on the light receiving face 21 of the line sensor 20.

As shown in FIG. 2, the imaging optical system 30 comprises a cylindrical lens 33, a biaxial refractive index profile type lens array 32 and a cylindrical lens 34 arranged in this order from the stimulable phosphor sheet 1 side between the stimulable phosphor sheet 1 and the line sensor 20.

Figure 3A:
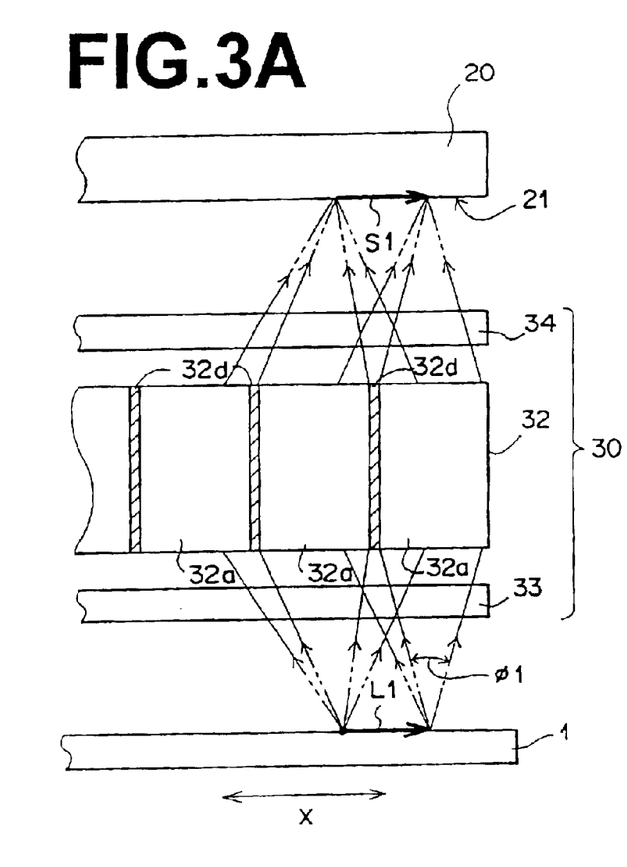
Figure 3B:
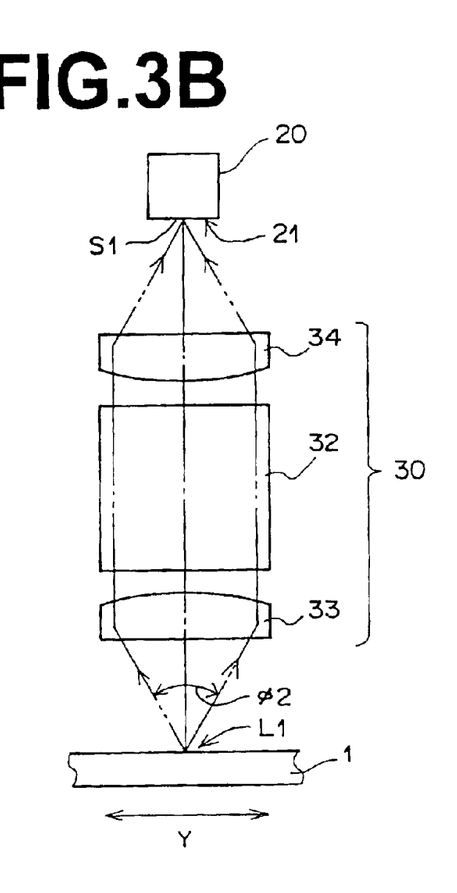
Figure 4:
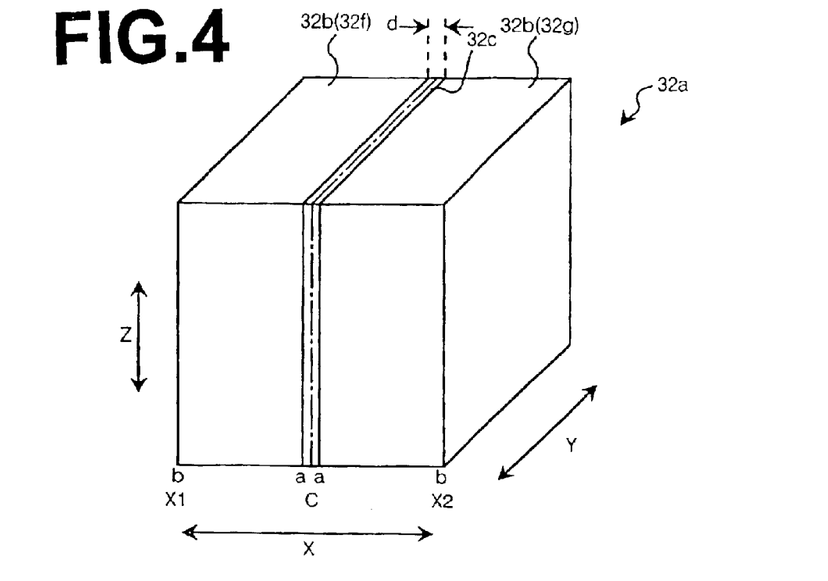
FIG. 4 is a perspective view of a refractive index profile type optical element employed in the imaging optical system shown in FIG. 3.

As shown in FIGS. 3A and 3B, the biaxial refractive index profile type lens array 32 is an erecting unit optical system comprising a plurality of refractive index profile type optical elements 32a arranged in the main scanning direction X. Each optical element 32a is like a rectangular prism in shape as shown in FIG. 4, and has a refractive index gradient where the refractive index is gradually reduced toward opposite ends X1 and X2 from the center C thereof, and a constant refractive index in the sub-scanning direction Y and a Z-direction perpendicular to the X-Y plane.

Figure 5:
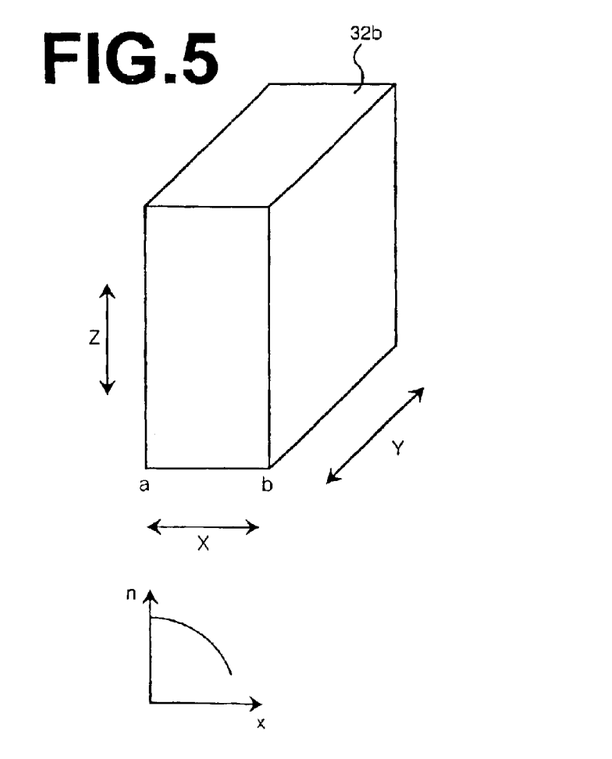
FIG. 5 is a perspective view of an axial lens employed in the refractive index profile type optical element shown in FIG. 4.

The optical element 32a is formed by a pair of axial lenses 32b shown in FIG. 5. The axial lens 32b has a refractive index gradient where the refractive index is gradually reduced from an end a toward the other end b and has a constant refractive index in the sub-scanning direction Y and the Z-direction. The optical element 32a is formed by bonding together a pair of axial lenses 32b at their higher refractive index side ends a.

By producing the optical element 32a in the manner described above, the degree of freedom in aperture and refractive index gradient is increased and production of the optical element 32a is facilitated. In this particular embodiment, the difference between the maximum refractive index at the center thereof and the minimum refractive index at the opposite ends thereof is not smaller than 0.02 and not larger than 0.2 so that the light collecting efficiency and the resolution in the main scanning direction X can be well balanced with each other.

Figure 6:
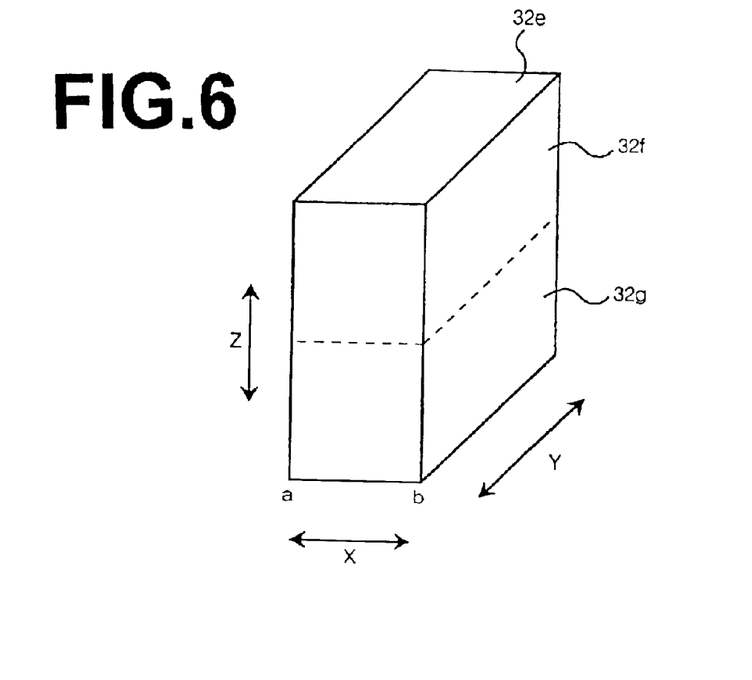
FIG. 6 is a perspective view for illustrating a method of producing a pair of axial lenses.

It is preferred that the optical element 32a be formed of a pair of axial lenses 32f and 32g which are formed by cutting as shown in FIG. 6, in two an axial lens 32e, having a refractive index profile where the refractive index is reduced from one end a toward the other end b and having a constant refractive index in the sub-scanning direction and the Z-direction, along a plane extending in the direction of the refractive index profile. By thus obtaining a pair of axial lenses 32f and 32g from a single axial lens 32e and forming an optical element 32a by bonding together the pair of axial lenses 32f and 32g at their higher refractive index side ends a by adhesive, mismatch of the refractive index at the joint between the pair of axial lenses can be avoided.

When the axial lenses 32b are bonded by adhesive, it is preferred that the refractive index n of the adhesive joint 32c (FIG. 7) satisfies formula $-0.02 \leq n - n_g \leq 0.1$ wherein, $n_g$ represents the refractive index of the pair of axial lenses at the portion in contact with the adhesive joint 32c, in order to prevent light from being reflected in total internal reflection at the interfaces between the adhesive joint 32c and the axial lenses 32b and disturbing imaging properties, and to prevent light passing through the interfaces from disturbing imaging properties due to an optical path shift at the adhesive joint 32c. The reason for this will be discussed in detail, hereinbelow.

Figure 7:
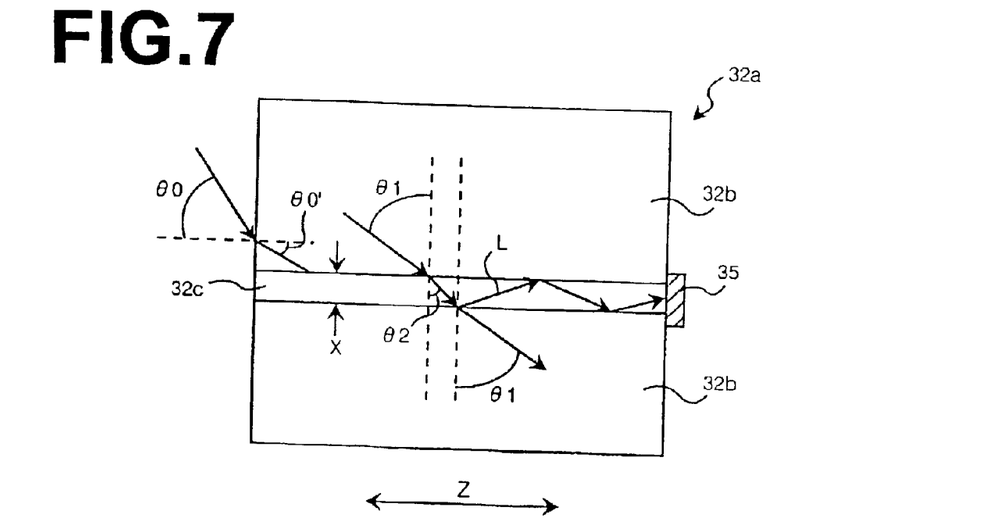
FIG. 7 is a view for illustrating the relation between the refractive index of the axial lenses and the refractive index of the adhesive joint.

When $n \geq n_g$, total internal reflection cannot occur at the interface between the axial lens 32b and the adhesive joint 32c. However, depending on the angle of incidence of light from the axial lens 32b to the adhesive joint 32c and the thickness of the adhesive joint 32c, an optical path shift can occur to deteriorate the resolution.

The amount y of the optical path shift can be obtained in the following manner. That is, when the angle of incidence of light from the axial lens 32b to the adhesive joint 32c is represented by θ1, the angle of emanation at the adhesive joint 32c is represented by θ2 and the thickness of the adhesive joint 32c is represented by x as shown in FIG. 7, the amount y of the optical path shift is represented by the following formula (1).

$$y = x \times \tan \theta 2 \quad (1)$$

$$\text{wherein } \theta 2 = \sin^{-1}[(ng/n) \times \sin \theta 1] \quad (2).$$

In order to prevent influence of the optical path shift on the resolution, it is preferred that the amount y of the optical path shift be not larger than 300 μm. That is, the thickness x of the adhesive joint 32c should be $$x \leq 300 \, \mu\text{m}/\tan \theta 2 \quad (3).$$

Whereas, influence on the resolution becomes larger as the angle of incidence θ1 of light from the axial lens 32b to the adhesive joint 32c becomes smaller. Since the maximum value of θ1 depends upon the numerical aperture NA of the lens, for instance, when $n - n_g$ is equal to 0.1, θ1 is about 64° (will be described in detail, later). Accordingly, when $n_g/n$ is substantially equal to 1.7/1.8, x≤about 187 μm from the formulae (2) and (3).

Accordingly, in the case where the thickness of the adhesive joint 32c is not larger than about 200 μm, influence on the resolution is suppressed and the optical performance can be held high when $n - n_g \leq 0.1$.

The reason why θ1 is about 64° when $n - n_g$ is equal to 0.1 is as follows. Assuming that the refractive index profile is as represented by the following formula (4), the maximum angle of incidence θ0 (FIG. 7) is as represented by the following formula (5).

$$n = n0\{1 - (A/2)x^2\} \quad (4)$$

wherein n0 represents the refractive index on the axis (the refractive index of the higher refractive index side end of the axial lens 32b), A represents the refractive index distribution constant, and x represents the distance from the center (the higher refractive index side end of the axial lens 32b) as measured in the main scanning direction X.

$$\theta 0 = n0 \cdot A^{1/2} \cdot x0 \quad (5)$$

wherein x0 represents the diameter of the lens (the width of the axial lens 32b in the main scanning direction X). When n0=1.7 and the difference between the maximum refractive index and the minimum refractive index=0.2, the maximum angle of incidence θ0 is 47°. (A=2(1−n/n0)/x0² from formula (4). When this A is substituted in formula (5), $\theta 0 = n0\{2(1 - n/n0)\}^{1/2}$. Accordingly, $\theta 0 = 1.7\{2(1 - 1.5/1.7)\}^{1/2} = 0.824\text{RAD} = 47°$.

Since θ0'=26° due to refraction in the axial lens 32b, and accordingly θ1 in the axial lens 32b=90°−26°=64°.

Whereas, when $n \leq n_g$, light is reflected in total internal reflection when the angle of incidence θ1 is not smaller than a predetermined angle. For example, when $n/n_g = 1.68/1.7$, the critical angle is about 81° and almost all the light is not reflected in total internal reflection but imaged. Though light whose angle of incidence θ1 is not smaller than 81° is reflected in total internal reflection, such light is naturally almost linear and the optical path thereof is imaged as a mirror image even if such light is reflected in total internal reflection. That is, when the angle of incidence is not smaller than 81°, turbulence due to total internal reflection is acceptable. In other words, when $n_g - n \leq 0.02$, influence on the resolution is suppressed and the optical performance can be held high.

Scattered light L can be propagated along the adhesive joint 32c by light guide phenomenon, as shown in FIG. 7, to generate an artifact. Generation of the artifact can be prevented by providing a light-shielding member on the light emanating end of the adhesive joint 32c.

Though, in the embodiment described above, a pair of axial lenses are bonded by adhesive, the axial lenses may be bonded, for instance, through an optical contact or by welding.

Further, as shown in FIG. 3A, the spaces between the optical elements 32a are filled with light-shielding members 32d. BY the light-shielding members 32d, the numerical apertures NA of each optical element 32a in the main scanning direction X is suitably limited and the resolution in the main scanning direction can be improved. Further, since light which is not imaged is absorbed by the light-shielding members 32d, blur due to scattered light can be prevented.

Though, in the embodiment described above, the spaces between the optical elements 32a are filled with light-shielding members 32d, instead, light-shielding paint may be applied to the interface between the axial lens 32b and the joint 32c. Such light-shielding paint may be applied to the interface after roughening the interface.

The cylindrical lenses 33 and 34, which form a condenser optical system, are arranged so that they have power in the sub-scanning direction Y and converge light divergent in the sub-scanning direction Y. By employing a cylindrical lens as the condenser optical system, the light collecting efficiency can be high. In order to increase the light collecting efficiency, it is preferred that the cylindrical lens be provided on both the light incident side and the imaging side of the lens array 32 as shown in FIGS. 3A and 3B. However, the cylindrical lens may be provided only on one of the light incident side and the imaging side of the lens array 32.

The stimulating light projecting means 10 comprises a laser diode array 11 which comprises a plurality of laser diodes arranged in the main scanning direction X and emits a line-like stimulating light beam extending in the main scanning direction X, and a cylindrical lens 12 which converges the stimulating light beam emitted from the laser diode array 11 only in the sub-scanning direction.

Operation of the radiation image read-out apparatus shown in FIG. 1 will be described, hereinbelow.

A line-like stimulating light beam extending in the main scanning direction X is projected onto the stimulable phosphor sheet 1 by the stimulating light projecting means 10. Upon exposure to the stimulating light beam, linear stimulated emission is emitted from the stimulable phosphor sheet 1 and is caused to enter the imaging optical system 30.

The stimulated emission entering the imaging optical system 30 is imaged on the light receiving face 21 of the line sensor 20 in the following manner.

Imaging in the main scanning direction X by the imaging optical system 30 will be described first. Since the cylindrical lenses 33 and 34 have no power of converging light bundle in the main scanning direction X, the cylindrical lenses 33 and 34 may be regarded as plane-parallel plates with respect to light propagated in the main scanning direction. Accordingly, stimulated emission emitted from the stimulable phosphor sheet 1 and propagated in the main scanning direction X is converged in the main scanning direction and imaged on the light receiving face 21 of the line sensor 20 only by the refractive power of the lens array 32 as shown in FIG. 3A. That is, the line-like stimulated emission L1 is imaged on the light receiving face 21 of the line sensor 20 as an erected unit image S1 in the main scanning direction X.

Imaging in the sub-scanning direction Y by the imaging optical system 30 will be described next. Since the lens array 32 is constant in refractive index in the sub-scanning direction Y and has no power of converging light bundle in the sub-scanning direction y, the lens array 32 may be regarded as a plane-parallel plate with respect to light propagated in the sub-scanning direction. Accordingly, stimulated emission emitted from the stimulable phosphor sheet 1 and propagated in the sub-scanning direction Y is converged and imaged on the light receiving face 21 of the line sensor 20 only by the refractive power of the cylindrical lenses 33 and 34 as shown in FIG. 3B.

The light bundle $\phi 1$ which contributes to imaging in the main scanning direction by the imaging optical system 30 is limited by the numerical aperture NA1 of the optical element 32a of the lens array 32 as shown in FIG. 3A. Whereas the light bundle $\phi 2$ which contributes to imaging in the sub-scanning direction by the imaging optical system 30 is limited by the numerical aperture NA2 of the cylindrical lenses 33 and 34 as shown in FIG. 3B. Though the larger the numerical aperture NA1 of the optical element 32a is, the higher the light collecting efficiency is, the resolution deteriorates when the numerical aperture NA1 of the optical element 32a is too large. Accordingly it is preferred that the numerical aperture NA1 of the optical element 32a be determined taking into account the light collecting efficiency in the sub-scanning direction or the numerical aperture NA2 of the cylindrical lenses 33 and 34. For this purpose, the numerical aperture NA1 of the lens array 32, which is an erecting unit optical system, is set to be smaller than the numerical aperture NA2 of the cylindrical lenses 33 and 34, which are a condenser optical system, in this particular embodiment.

When the imaging optical system 30 is arranged in the manner described above, an erected unit image having a light collecting efficiency well balanced with the resolution is formed on the light receiving face 21 of the line sensor 20.

The linear image of stimulated emission imaged on the light receiving face 21 of the line sensor 20 is output as an image signal through photoelectric conversion by the photoelectric convertor elements of the line sensor 20.

The line-like stimulating light beam extending in the main scanning direction is projected onto the stimulable phosphor sheet 1 while the stimulable phosphor sheet 1 is conveyed in the sub-scanning direction, whereby the stimulating light beam is two-dimensionally projected onto the stimulable phosphor sheet 1 and the two-dimensional radiation image recorded on the stimulable phosphor sheet is read out.

In the imaging optical system in accordance with the embodiment described above formed by a refractive index profile type lens array 32 consisting of a plurality of optical elements 32a, each having a refractive index profile where the refractive index is gradually reduced toward its ends from its center, arranged in the main scanning direction X, and a pair of cylindrical lenses 33 and 34 which have a refracting power only in the sub-scanning direction and are respectively disposed on the light incident side and the imaging side of the lens array 32, the aperture of the lens can be larger and the refractive index gradient can be sharp, whereby the numerical aperture NA can be large and the light collecting efficiency can be improved. At the same time, since numerical aperture of the optical element 32a in the main scanning direction X is smaller than the numerical aperture of the cylindrical lenses 33 and 34 in the sub-scanning direction Y, light can be imaged in the main scanning direction X at a high light collecting efficiency without deteriorating the resolution.

Figure 8:
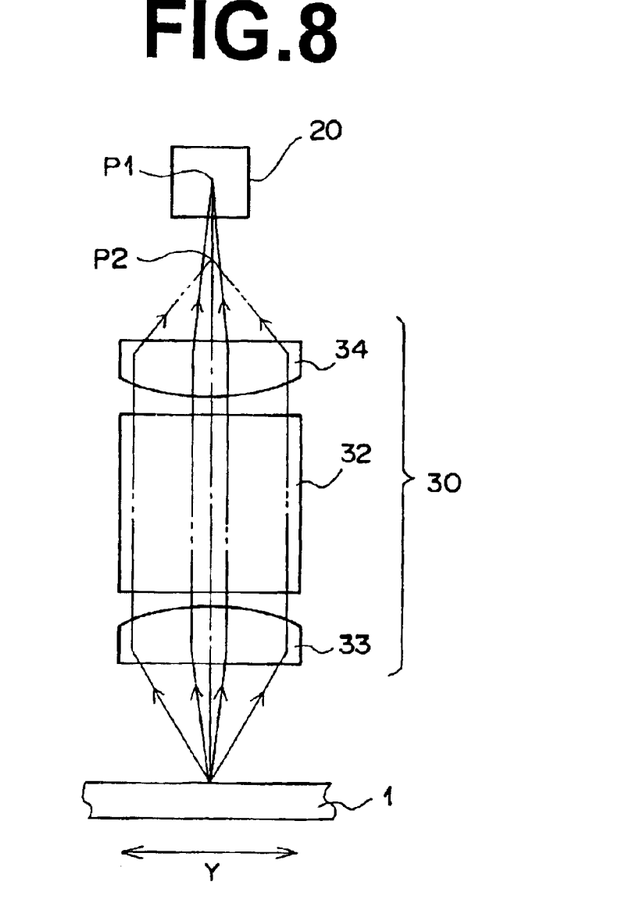
FIG. 8 is a view for illustrating imaging when a non-aspheric lens is used as the cylindrical lens.
Figure 9:
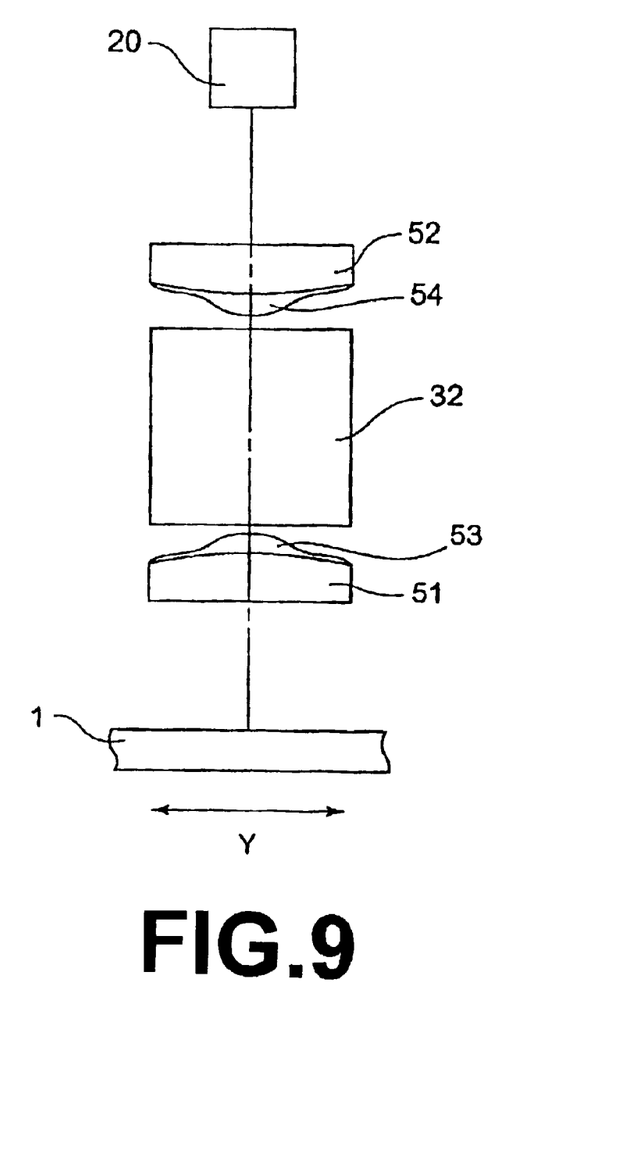
FIG. 9 is schematic view showing a modification of the imaging optical system where an aspheric lens is used as the cylindrical lens.

In the embodiment described above, the cylindrical lenses 33 and 34 have no aspheric component. When the cylindrical lenses 33 and 34 have no aspheric component, spherical aberration of the cylindrical lenses 33 and 34 cannot be corrected and stimulated emission emitted from the stimulable phosphor sheet 1 cannot be accurately imaged on the light receiving face 21 of the line sensor 20. That is, stimulated emission passing through the center of the cylindrical lenses 33 and 34 is focused on a point P1 on the back of the light receiving face 21 and that passing through the periphery of the cylindrical lenses 33 and 34 is focused on a point P2 on the front of the light receiving face 21, whereby a linear image of the stimulated emission imaged through the imaging optical system 30 is blurred. This can be avoided by the use of aspheric cylindrical lenses comprises glass cylindrical lenses 51 and 52 and resin aspheric lenses 53 and 54 respectively superposed on the cylindrical lenses 51 and 52 as shown in FIG. 9.

Figure 10A:
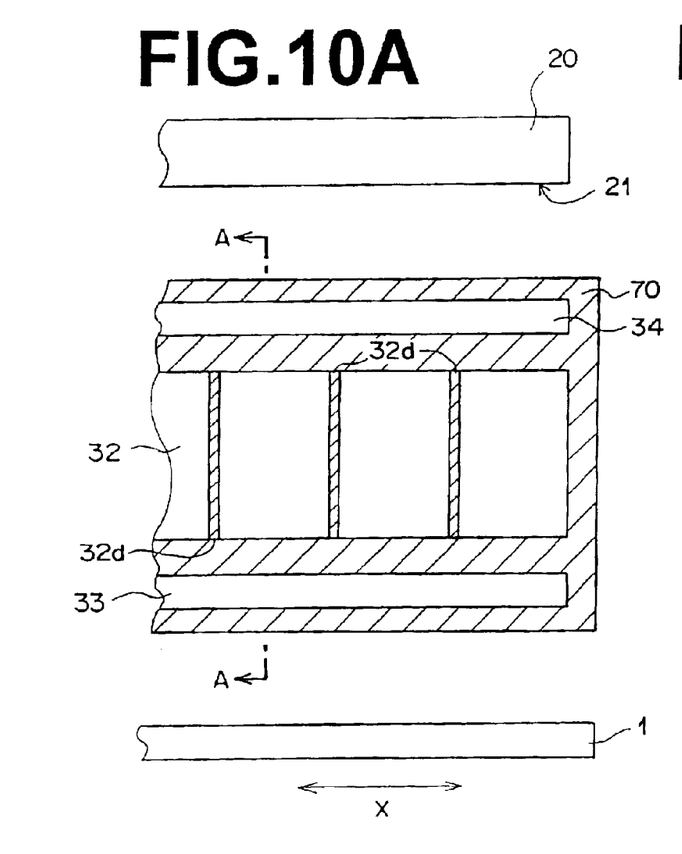
FIG. 10A is a side view partly cross-section showing another modification of the imaging optical system.
Figure 10B:
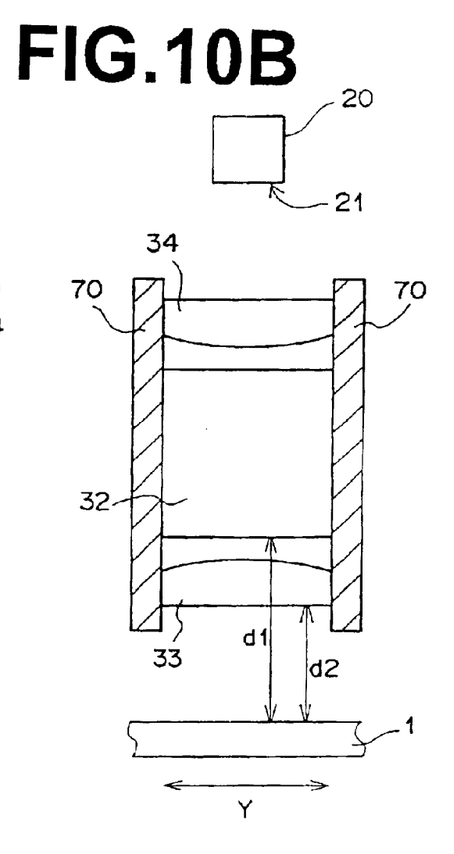
FIG. 10B is a cross-sectional view taken line A—A in FIG. 10A, FIGS. 11A and 11B are side and front views for illustrating a modification of the radiation image read-out apparatus shown in FIG. 1.

The imaging optical system 30 may be fixedly mounted on a side plate 70 which covers the surfaces of the imaging optical system 30 other than the light incident side surface and the imaging side surface as shown in FIGS. 10A and 10B. It is preferred that the side plate 70 be formed of a material which cuts stimulated emission which does not contribute to imaging and/or the stimulating light beam.

In the case where the lens array 32 and the cylindrical lenses 33 and 34 are fixed to the side plate 70, it is preferred that the working distance d1 of the lens array 32, the working distance d2 of the cylindrical lenses 33 and 34, and the thickness d3 of the cylindrical lenses 33 and 34 satisfy the following formula (6) or the following formula (7).

$$d3 \times 3 > d1-d2 > d3 \quad (6)$$

$$3 > d1/d2 > 1.1 \quad (7)$$

It is preferred that the lens array 32 and/or the cylindrical lenses 33 and 34 be formed of a material which cuts stimulating light. Otherwise, film of stimulating light cutting material may be provided over a part or the entire area of the surface of the lens array 32 and/or the cylindrical lenses 33 and 34.

An antireflection coating may be provided on the light incident face of the lens array 32 so that light reflected at the light incident face of the lens array 32 does not return to the stimulable phosphor sheet 1.

As the lenses for the light condenser optical system, for instance, GRIN cylindrical lenses or binary lenses may be employed in place of the cylindrical lenses described above.

Figure 11A:
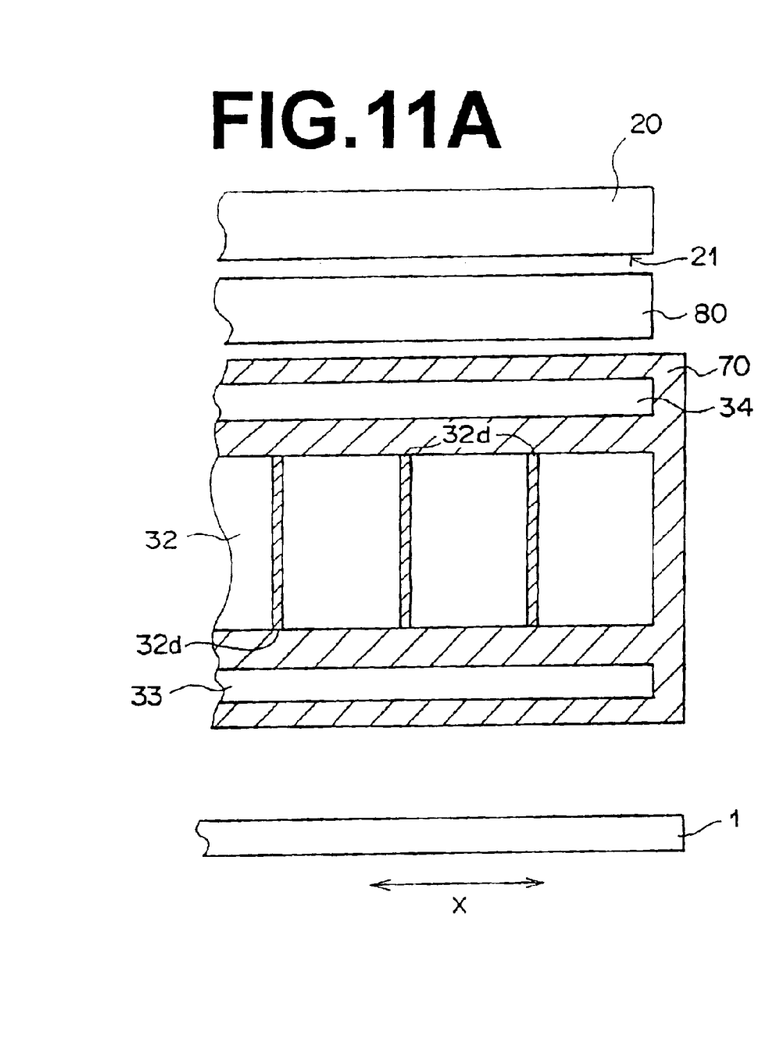
Figure 11B:
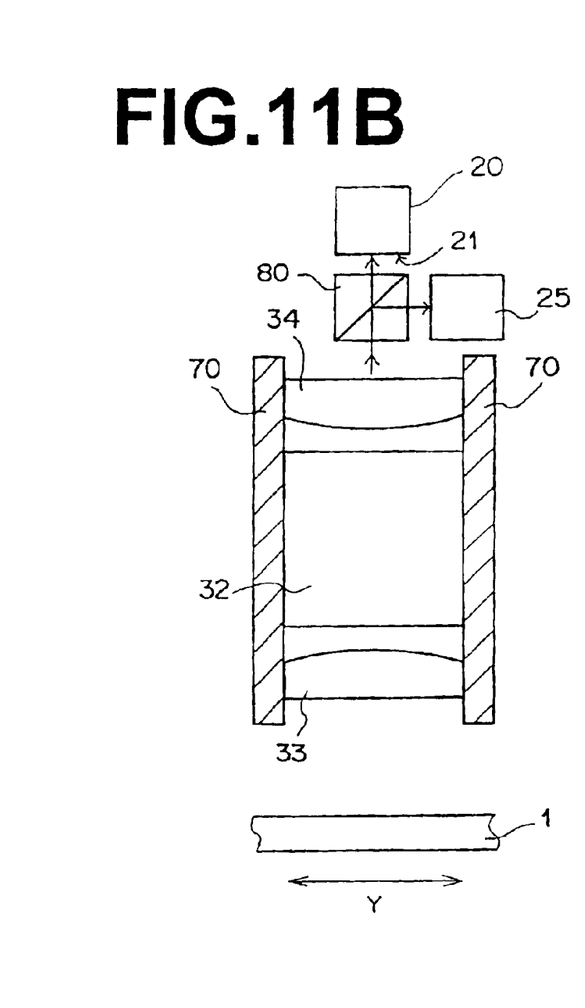
Figure 12:
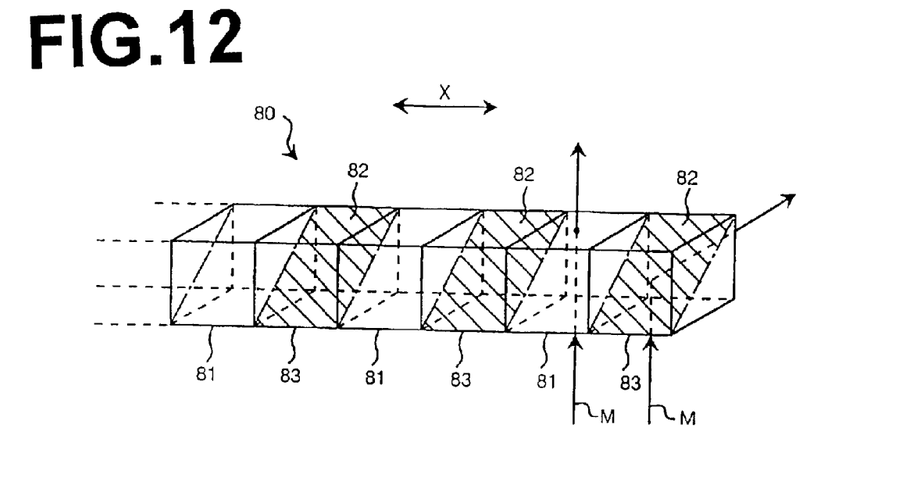
FIG. 12 is a view for illustrating in detail the optical element array employed in the radiation image read-out apparatus illustrated in FIGS. 11A and 11B.

Further, it is possible to provide an optical element array 80 as shown in FIGS. 11A and 11B so that stimulated emission from the stimulable phosphor sheet is partly received by a first line sensor 20 and partly by a second line sensor 25. As shown in detail in FIG. 12, the optical element array 80 comprises a plurality of first optical elements 81 transmitting stimulated emission M and a plurality of second optical elements 83 each having reflecting surface 82 which reflects stimulated emission M. The first and second optical elements 81 and 83 are alternately arranged in the main scanning direction X.

Figure 13:
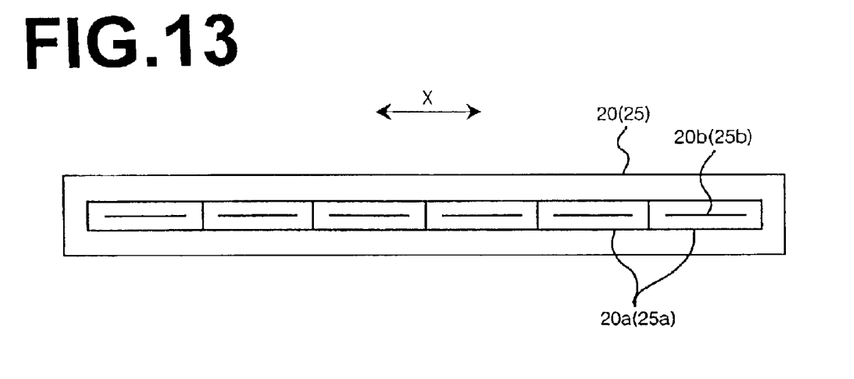
FIG. 13 is a view for illustrating the line sensor employed in the radiation image read-out apparatus illustrated in FIGS. 11A and 11B, and FIG. 14 schematically shows arrangement of the line sensors when stimulated emission is imaged on a pair of line sensors.

Each of the first and second line sensors 20 and 25 comprises a plurality of sensor chips 20a (25a) as shown in FIG. 13. Reference numeral 20b (25b) denotes effective areas of the sensor chip 20a (25a) sensitive to stimulated emission M.

Figure 14:
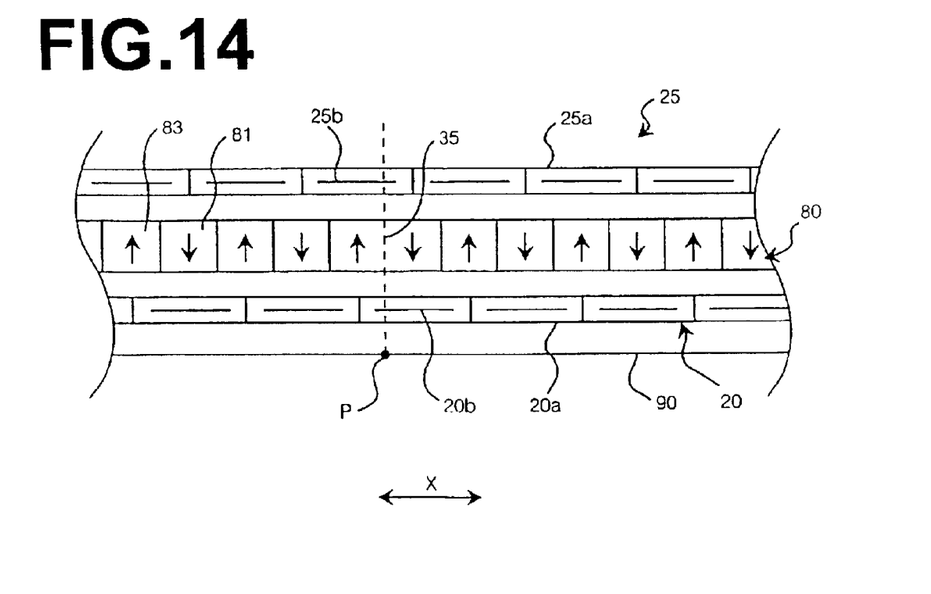

As shown in FIG. 14, the first and second line sensors 20 and 25 are disposed so that effective areas 20b of the first line sensor 20 and the effective areas 25b of the second line sensor 25 receive stimulated emission M emitted from different portions of the linear areas 90 of the stimulable phosphor sheet 1 exposed to the line-like stimulating light beam, and, stimulated emission M passing through the first optical elements 81 of the optical element array 80 is imaged on the effective areas 20b of the first line sensor 20, whereas stimulated emission M reflected at the reflecting surfaces 82 of the second optical elements 83 of the optical element array 80 is imaged on the effective areas 25b of the second line sensor 25. Stimulated emission M emitted from portions of the linear areas 90 of the stimulable phosphor sheet 1 corresponding to boundaries 35 between the first and second optical elements 81 and 83 is received partly by the first line sensor 20 and partly by the second line sensor 25. However, by adding by pixels the signal components output by both the line sensors 20 and 25 in a signal processing means or the like (not shown) connected to the radiation image read-out apparatus, the amounts of stimulated emission detected for all the pixels can be uniformed.

The imaging optical system of the present invention can be applied not only radiation image read-out apparatuses described above, but also to other apparatuses for reading a two-dimensional image such as those in which fluorescent marks are two-dimensionally arranged.

What is claimed is:

1. An imaging optical system which images a line image extending in a main scanning direction in a two-dimensional image as an erected image at a unit magnification in the main scanning direction, wherein the imaging optical system comprises an erecting unit optical system consisting of a plurality of refractive index profile type optical elements, each having a refractive index profile where the refractive index is reduced toward opposite ends in the main scanning direction from the center thereof, arranged in the main scanning direction, and a condenser optical system which is disposed along the main scanning direction on the light incident side or on the light incident side and the imaging side of the erecting unit optical system and has a power only in a sub-scanning direction, and the numerical aperture in the main scanning direction of each of said refractive index profile type optical elements is smaller than the numerical aperture in the sub-scanning direction of the condenser optical system.

2. An imaging optical system as defined in claim 1 in which the difference between the maximum refractive index and the minimum refractive index is not smaller than 0.02 and not larger than 0.2.

3. An imaging optical system as defined in claim 1 in which each refractive index profile type optical element is formed of a pair of axial lenses each of which has a refractive index profile where the refractive index is reduced from one end to the other and which are bonded together at their higher refractive index side ends.

4. An imaging optical system as defined in claim 3 in which each refractive index profile type optical element is formed by bonding said pair of axial lenses by adhesive, and the adhesive joint is not larger than 200 μm in thickness and the refractive index $\underline{n}$ of the adhesive joint satisfies formula $$-0.02 \leq n-n_g \leq 0.1$$

wherein, $n_g$ represents the refractive index of the pair of axial lenses at the portion in contact with the adhesive joint.

5. An imaging optical system which images a line image extending in a main scanning direction in a two-dimensional image as an erected image at a unit magnification in the main scanning direction, wherein the imaging optical system comprises an erecting unit optical system consisting of a plurality of refractive index profile type optical elements, each having a refractive index profile where the refractive index is reduced toward opposite ends in the main scanning direction from the center thereof, arranged in the main scanning direction, and a condenser optical system which is disposed along the main scanning direction on the light incident side or on the light incident side and the imaging side of the erecting unit optical system and has a power only in a sub-scanning direction, and a light-shielding structure is provided between said refractive index profile type optical elements.

6. An imaging optical system as defined in claim 5 in which the difference between the maximum refractive index and the minimum refractive index is not smaller than 0.02 and not larger than 0.2.

7. An imaging optical system as defined in claim 5 in which each refractive index profile type optical element is formed of a pair of axial lenses each of which has a refractive index profile where the refractive index is reduced from one end to the other and which are bonded together at their higher refractive index side ends.

8. An imaging optical system as defined in claim 7 in which each refractive index profile type optical element is formed by bonding said pair of axial lenses by adhesive, and the adhesive joint is not larger than 200 μm in thickness and the refractive index $\underline{n}$ of the adhesive joint satisfies formula $$-0.02 \leq n - n_g \leq 0.1$$

wherein, $n_g$ represents the refractive index of the pair of axial lenses at the portion in contact with the adhesive joint.

* * * * *